US012607494B2

(12) United States Patent
Otto et al.

(10) Patent No.: US 12,607,494 B2
(45) Date of Patent: Apr. 21, 2026

(54) EMPTYING DETECTION DEVICE, EMPTYING SYSTEM AND EMPTYING DETECTION METHOD

(71) Applicant: OTTO ID SOLUTIONS GMBH, Frankfurt (DE)

(72) Inventors: Karsten Otto, Frankfurt (DE); Tobias Lake, Frankfurt (DE)

(73) Assignee: OTTO ID SOLUTIONS GMBH, Frankfurt (DE)

( * ) Notice: Subject to any disclaimer, the term of this patent is extended or adjusted under 35 U.S.C. 154(b) by 42 days.

(21) Appl. No.: 18/568,715

(22) PCT Filed: Jun. 13, 2022

(86) PCT No.: PCT/EP2022/066024
§ 371 (c)(1),
(2) Date: Dec. 8, 2023

(87) PCT Pub. No.: WO2022/258848
PCT Pub. Date: Dec. 15, 2022

(65) Prior Publication Data
US 2024/0271986 A1 Aug. 15, 2024

(30) Foreign Application Priority Data
Jun. 11, 2021 (DE) .......................... 102021115218.6

(51) Int. Cl.
*G01F 23/284* (2006.01)
*G01F 23/04* (2006.01)
(52) U.S. Cl.
CPC .......... *G01F 23/2845* (2013.01); *G01F 23/04* (2013.01)

(58) Field of Classification Search
CPC ............................ G01F 23/2845; G01F 23/04
(Continued)

(56) References Cited

U.S. PATENT DOCUMENTS

| | | | | |
|---|---|---|---|---|
| 4,554,939 A | * | 11/1985 | Kern | .................... G05D 11/138 |
| | | | | 222/134 |
| 2003/0098783 A1 | * | 5/2003 | Pagnol | ................. G06K 7/0008 |
| | | | | 340/10.1 |

(Continued)

FOREIGN PATENT DOCUMENTS

| | | |
|---|---|---|
| DE | 10159359 A1 | 6/2003 |
| DE | 202013103563 U1 | 11/2014 |
| EP | 2868622 A1 | 5/2015 |

*Primary Examiner* — Kerri L Mcnally
(74) *Attorney, Agent, or Firm* — Brooks Kushman P.C.

(57) ABSTRACT

The present disclosure relates to an emptying detection device configured to provide an emptying signal to an emptying system for emptying a container, such as a dosing system including a suction lance, a corresponding suction lance and a corresponding emptying system. The emptying detection device is configured to determine a level of a liquid in the container relative to the emptying detection device, the emptying detection device comprising: a sending and receiving unit being configured to emit electromagnetic waves and to receive electromagnetic waves, and a transponder unit being configured to receive electromagnetic waves from the sending and receiving unit, and to emit a signal in response to the received electromagnetic waves. The sending and receiving unit is configured to emit electromagnetic waves at a frequency for which the liquid has a non-negligible absorption coefficient, and to provide an emptying signal to the emptying system in response to receipt of the signal from the transponder unit.

16 Claims, 12 Drawing Sheets

(58) Field of Classification Search
USPC .......................................................... 340/618
See application file for complete search history.

(56) References Cited

U.S. PATENT DOCUMENTS

| 2006/0192679 | A1* | 8/2006 | Buckley | .............. | G01F 23/2885 |
| | | | | | 340/618 |
| 2008/0073800 | A1* | 3/2008 | Finn | ..................... | H01Q 1/2225 |
| | | | | | 257/784 |
| 2018/0089478 | A1* | 3/2018 | Neyrou | ........... | G06K 19/07762 |

* cited by examiner

EMPTYING DETECTION DEVICE, EMPTYING SYSTEM AND EMPTYING DETECTION METHOD

CROSS-REFERENCE TO RELATED APPLICATIONS

This application is a U.S. National Phase of PCT Application No. PCT/EP2022/066024 filed Jun. 13, 2022, which claims priority to German Patent Application No. 102021115218.6 filed Jun. 11, 2021, the disclosure of which is hereby incorporated in its entirety by reference herein.

TECHNICAL FIELD

The present application relates to an emptying detection device configured to provide an emptying signal to an emptying system for emptying a container, such as a dosing system including a suction lance.

BACKGROUND

Reed switches may be used in emptying detection devices. Typically, a reed switch is mounted and sealed in a nonmagnetic material and a ring magnet is mounted on a floater that can move upwards and downwards on a suction lance depending on the liquid level. Also known from the state of the art are emptying detection devices based on a conductivity measurement, where the conductivity will fall if the level of the liquid gets below the level of the said device.

Both methods have a relatively large measurement uncertainty. There are applications where it is important to obtain an emptying signal before the container is completely empty, for example to prevent that air is sucked into a suction pump. However, a relatively large measurement uncertainty implies that it is necessary, for safety reasons, to stop emptying a container early such as to make sure, for example, that no air is sucked into a suction pump. This is because a relatively large measurement uncertainty results in an imprecisely known liquid level.

Using the above-mentioned known approaches for such an application implies that, for safety reasons, a relatively large amount of liquid will be unusable and remain in the container due to the relatively large measurement uncertainty of the mentioned approaches.

The present application discloses an improved emptying detection for emptying systems, which allows to reduce the amount of unusable remaining fluid in a container.

SUMMARY

The present disclosure solves this task with an emptying detection device configured to provide an emptying signal to an emptying system for emptying a container, such as a dosing system including a suction lance, the emptying detection device being configured to determine a level of a liquid in the container relative to the emptying detection device, the emptying detection device comprising a sending and receiving unit being configured to emit electromagnetic waves and to receive electromagnetic waves, and a transponder unit being configured to receive electromagnetic waves from the sending and receiving unit, and to emit a signal in response to the received electromagnetic waves, and wherein the sending and receiving unit is configured to emit electromagnetic waves at a frequency for which the liquid has a non-negligible absorption coefficient, and to provide an emptying signal to the emptying system in response to receipt of the signal from the transponder unit.

Thus, receipt of the signal of the transponder unit itself is used to determine whether of not the container is empty or not. If the signal is received, the container is empty. If the signal is not received, i.e., the signal is absorbed by the liquid, the container is not empty yet.

The emptying signal is preferentially provided in case both of the transponder unit and the sending end receiving unit are located below the level of liquid. This is the case when both the sending and receiving unit and the transponder unit are attached to the suction lance, for instance, and the liquid level drops below both units as the emptying of the container proceeds.

Additionally or alternatively, the signal is provided in case the path between sending and receiving unit and transponder unit is not obstructed by liquid. In this context, whether the path between sending and receiving unit and transponder unit is obstructed by liquid can preferentially be determined by evaluating a reception quality of the signal from the transponder unit. The reception quality can be determined, for instance, using the reception field strength (RSSI value) or the number of times a transponder was detected within a time interval or a combination of both values. Both the RSSI value and the number of times the transponder was detected can be compared with corresponding predefined threshold values.

The emptying detection device is configured to provide an emptying signal when a certain level of liquid is reached, typically in response to the liquid level crossing at least a part of the emptying detection device. Preferentially, the emptying signal is provided in case the level of the liquid falls below a level of both of the sending and receiving unit and the transponder unit. The certain level of the liquid is in this case the level at which the lower unit out of the sending and receiving unit and the transponder unit will not be covered with the liquid anymore.

The emptying detection device is being used, for example, in a dosing system including a suction lance, where the emptying detection device can be mounted on the suction lance and is configured to determine a level of a liquid with respect to itself. Therefore, the provided signal can be directly relevant for the position of the suction lance.

The emptying detection device comprises a sending and receiving unit that is configured to emit electromagnetic waves and to receive electromagnetic waves and a transponder unit which is configured to receive electromagnetic waves from the sending and receiving unit. The transponder is also configured to emit a signal in response to received electromagnetic waves, e.g., in response to receiving waves emitted from the sending and receiving unit. The response signal of the transponder unit is preferentially only emitted under the prerequisite that the transponder unit is not covered by the liquid.

The transponder may only emit a signal when the liquid level falls below both, the transponder and the sending and receiving unit. In response to the signal emitted by the transponder unit and received by the sending and receiving unit, the sending and receiving unit will emit an emptying signal to the emptying system.

The use of electromagnetic waves has the advantage that it allows to precisely measure a liquid level, it does not include any mechanical parts that will degrade with usage and it is maintenance free, in contrast to, for example, a reed sensor with its swimmer that includes a magnet.

Thus, since the measurement can be carried out more accurately than with previously known emptying detection devices, a lower safety margin is necessary and a lower threshold level for signaling the emptying of the container can be provided. As a consequence, the remaining liquid in the container can be reduced and the useful volume of the liquid can be increased, thereby further reducing the operating costs of the, for instance, dosing system.

The sending and receiving unit may be configured to emit electromagnetic waves at a frequency for which the liquid has a non-negligible absorption coefficient. Thereby, it can be ensured that electromagnetic waves are sufficiently attenuated and do not reach the transponder unit unless no liquid is present in the space between the sending and receiving unit and the transponder unit. In this context, it should be emphasized that "do not reach" and "no liquid" is understood to include cases in which an negligible amount of electromagnetic energy below a predefined threshold reaches the transponder unit and/or a negligible amount of liquid is present in the space between the sending and receiving unit and the transponder.

A liquid having non negligible absorption for the emitted frequency such as high-frequency energy ensures that the presence of liquid between the sending and receiving unit and the transponder unit absorbs sufficient electromagnetic energy at the emitted frequency, such that no or no significant amount of the emitted electromagnetic waves can reach the transponder unit. This is the case for all typically used liquids in emptying systems, including liquids based on water, oil, and/or solvent.

Non negligible is to be understood as that a closed layer of the liquid, a layer having minimum thickness of 1 millimeter, absorbs more than 10%, e.g., more than 50% and alternatively at least 80% of the energy of the electromagnetic wave emitted by the sending and receiving unit. The sending and receiving unit is configured to provide an emptying signal in response to receipt of the signal from the transponder, which the transponder sent back in response of the transponder receiving electromagnetic waves from the sending and receiving unit.

In other words, if the sending and receiving unit and/or the transponder unit are covered with the liquid or if there is a layer of the liquid between the sending and receiving unit and the transponder unit, the absorption by the liquid is strong enough to prevent the emptying detection device to provide a signal to the higher-level emptying system.

In combination, the emptying detection device according to this embodiment can provide an emptying signal having a high reliability, which allows the remaining liquid when emptying a container to be reduced. Further, since no mechanical components are used, durability and resistance against environmental influences is improved, while at the same time reducing the effort of maintenance.

The sending and receiving unit preferentially comprises an antenna component, which is further preferentially adapted to an operating frequency of the transponder unit. Further, the sending and receiving unit preferentially comprises a processing component which is configured to control the emission of electromagnetic waves by the antenna unit, and to analyze received electromagnetic waves or signals, including received electromagnetic waves which were emitted by the transponder unit.

The processing component of the sending and receiving unit can, for example, include a microchip or microprocessor or any other known data processing component and can partially or fully implemented by software and/or hardware. The processing component can also perform the processing necessary to provide an emptying signal to the emptying system in response to receipt of the signal from the transponder unit.

In one embodiment of the emptying detection device, the sending and receiving unit is configured to adapt the emptying signal as an analogue or digital signal according to an interface of the emptying system.

The analogue signal can be given as an arbitrary voltage, for example 12 Volt or 24 Volt alternating or direct current (AC/DC), whereas the digital signal is a signal that is being used to represent data as a sequence of discrete values. The advantage of the sending and receiving unit being configured to adapt the emptying signal according to an interface of the emptying system is its compatibility to emptying systems. Thus, no further modification to the emptying system is necessary.

In one embodiment of the emptying detection device, the emptying signal is a binary signal, the binary signal indicating either empty or not empty.

The signal can thus be compliant with existing emptying detection devices, such as a reed contact.

In one embodiment of the emptying detection device, the transponder unit comprises an RFID transponder, such as, a passive RFID transponder.

RFID transponders are widely known and have been employed in different applications. For example, passive RFID transponders yield the advantage that no dedicated power supply, such as a battery or the like, is needed. Instead, the passive RFID transponder absorbs electromagnetic energy, which is then converted into the signal emitted therefrom. Thus, also a wiring effort can be reduced when employing an RFID transponder.

More preferentially, the passive RFID transponder is adjusted to work on the same frequency range as the emitted electromagnetic energy from the sending and receiving unit. Thus, only in case no or no substantial liquid is present between the sending and receiving unit and the passive RFID transponder, sufficient energy for operating the passive RFID transponder can be harvested by the RFID transponder. Then, also only in case no liquid is present between the RFID transponder and the sending and receiving unit, an emptying signal can be received.

In a preferred embodiment of the emptying detection device, the RFID transponder is configured to operate in an ISM-band, such as at least one of an HF-RFID, UHF-RFID and GHz-RFID transponder.

The ISM radio bands or ISM-band are portions of the radio spectrum reserved internationally for industrial, scientific and medical (ISM) purposes other than telecommunications. The ISM bands are defined, for instance, by the ITU Radio Regulations (article 5) in footnotes 5.138, 5.150, and 5.280 of the Radio Regulations. Individual countries' use of the bands designated in these sections may differ due to variations in national radio regulations.

For example, the RFID sending and receiving unit and the RFID transponder is configured to operate in at least one of the following frequency ranges widely used for RFID applications: Low Frequency (LF, generally 30-500 kHz), e.g., 125, 134, 250, 375, 500, 625, 750 and 875 kHz; High Frequency (HF, 3-30 MHz), e.g., 13.56 MHz; Ultra High Frequency (UHF) at 433 MHz (USA, DoD) and 865-869 MHz (EPC and others), also 865-868 MHz (Europe) or 902-928 MHz (USA) and 916-921 MHz (Japan), and Super High Frequency (SHF) at 2.4-2.5 GHz, e.g., 2.45 GHz, and 5.8 GHz.

For all these exemplary frequencies, the absorption for liquids is non-negligible in the sense of the present application. However, it should be emphasized that also other suitable frequencies are contemplated.

In one embodiment of the emptying detection device, the transponder unit is attachable to the emptying system, such as to a suction lance of the emptying system.

Thereby, the position of the transponder unit is coupled with the position of the emptying system, e.g., with the suction lance, and can therefore generate an emptying signal that is coupled to and therefore directly indicative for the emptying system. In case where the transponder unit is attachable to the suction lance, it may provide the emptying signal based on a position of the suction lance. Even if a mounting position of the suction lance would not be optimum, the emptying signal can reliably be provided based on the actual mounting position of the suction lance.

The sending and receiving unit, may in this embodiment, be mounted inside or outside of the container, for instance attached to the container, or it may also be attachable to the emptying system, such as the suction lance.

In one or more embodiments of the emptying detection device, the sending and receiving unit and the transponder unit are attachable to the emptying system, e.g., to the suction lance, the transponder unit being attachable to a position closer to an end of the emptying system than the sending and receiving unit.

The end of the emptying system may be the side of the emptying system through which the liquid is soaked for emptying the container. Thus, the transponder unit will remain submerged for a longer time compared to the sending and receiving unit. Only when both the sending and receiving unit and the transponder unit rise above a level of the liquid, will the emptying signal be provided.

In other embodiments, the transponder unit is attachable to a position farther away from the end of the emptying system than the sending and receiving unit. In this embodiment, the role of the transponder unit and the sending and receiving unit switch, i.e., the sending and receiving unit will be submerged up to a lower filling level of the container.

In one embodiment of the emptying detection device, only the sending and receiving unit is attachable to the emptying system, e.g., to a suction lance of the emptying system. The transponder component may in this embodiment be mounted inside or outside of the container, for instance attached to the container.

In one embodiment of the emptying detection device, the sending and receiving unit is configured to send and to receive electromagnetic waves at a frequency at which the liquid is absorbing, e.g., in an ISM-band of at least one of an HF, UHF and GHz frequency range.

The frequency at which the sending and receiving unit sends electromagnetic waves may thus be aligned with and correspond to the frequency emitted by the transponder unit. In other examples, a different frequency is employed for sending and receiving electromagnetic waves, respectively. For instance, the transponder unit may receive energy at a higher frequency than the sending frequency, at which the transponder unit transmits the generated signal. Thus, the sending and receiving unit correspondingly is configured to send and receive at respectively different frequencies.

In one embodiment of the emptying detection device, the transponder unit comprises a transponder element such as a transponder chip, wherein a size of the transponder chip is not more than 1 cm, in particular not more than 0.5 cm, most preferably not more than 0.1 cm.

A transponder chip having a relatively small size allows a high detection resolution and measurement accuracy. In particular, a small change in the liquid level will result in a detectable change in the coverage of the transponder chip with the liquid.

In one embodiment of the emptying detection device, at least one of the sending and receiving unit and the transponder unit has an annular shape.

Advantageously, the annular shape allows an emptying channel for pumping the liquid out of the container to be provided inside the annularly shaped unit. Thus, the sending and receiving unit and/or the transponder unit can be arranged around the emptying channel, which is provided, for example, in a suction lance. A reliable detection of the emptying of the container can therefore be ensured even in case the suction lance or the emptying channel is provided in an orientation being inclined with regard to a vertical direction within the container.

In one embodiment of the emptying detection device, the transponder unit comprises a plurality of transponder chips, wherein the plurality of transponder chips is distributed over the transponder unit.

A plurality of transponder chips allows that the emptying detection device can reliably determine the emptying of the system even in case the transponder component is tilted. This is the case because at least one of the plurality of transponder chips will, in the case of a tilted or inclined transponder component, be located above a central position of the transponder component and thus receive and/or emit electromagnetic waves in due course.

In one embodiment of the emptying detection device, the plurality of transponder chips is distributed equidistantly, preferably four transponder elements are placed equidistantly.

Four transponder chips allow for a 90° spacing, which ensures sufficient accuracy while keeping the number of transponder chips low. However, also higher or lower numbers of transponder chips are contemplated.

In a one embodiment of the emptying detection device, the sending and receiving unit and/or the transponder unit are coated with a polymer material.

The polymer material may include a non-conductive material. Further, the polymer material includes a non-absorbing material, i.e., a material that transmits the electromagnetic waves of the emptying detection device.

The material may include PVC (polyvinyl chloride) which, because it has non-absorbing properties, is resistant to chemicals, and highly suitable in dosing systems.

In one embodiment of the emptying detection device, the sending and receiving unit and the transponder unit are coated with a polymer material such as to form an independent unit.

In this embodiment, the sending and receiving unit and the transponder unit can be packaged and be provided as an independent or stand-alone unit, which can then be mounted, for instance, to a suction lance.

In one embodiment of the emptying detection device, only part of the space between the sending and receiving unit and the transponder unit can be filled by the liquid.

It is not necessary that the entire space between both units be filled with liquid. Instead, in some embodiments, it may be the case that the coating material or another transmissive material be provided in the space between the sending and receiving unit and the transponder unit. The coating or material may protect the respective components from being damaged and/or may provide an inclined surface to support the flow of the liquids from the respective surface.

In one embodiment of the emptying detection device, the part that is between the sending and receiving unit and the transponder unit and which can be filled by the liquid provides a geometrical shape that helps the liquid to flow off, in particular an inclined surface.

In a one embodiment of the emptying detection device, the emptying detection device is attachable or integrated in a suction lance made out of a polymer material, allowing the propagation of electromagnetic waves in an ISM-band, in particular an ISM-band at least one of an HF, UHF and GHz frequency range through the suction lance.

In a second aspect, a suction lance for an emptying system for emptying a container, such as a dosing system, includes the emptying detection device or an embodiment of the emptying detection device according to the present disclosure is provided. The suction lance comprises a hollow guiding element, wherein liquid is sucked through the hollow guiding element for emptying the container, and at least one of the sending and receiving unit and the transponder unit is mounted in proximity to an end of the hollow guiding element.

The emptying detection device is attachable to the suction lance, e.g., in proximity to an end of the suction lance. In proximity refers to a distance of less than 20% of a total length of the hollow guiding element. In typically sized suction lances, in proximity is less than 5 cm from the end of the hollow guiding element. The closer the mounting position becomes to the end of the hollow guiding element, the more accurate will the emptying detection be.

The end of the suction lance is understood as the position, where the liquid enters the suction lance, wherein a suction lance comprises a longitudinal, hollow guiding element or cylinder, through which the liquid is sucked out of the container.

In a one embodiment the suction lance further comprises a sieve removably attached to the hollow guiding element, wherein the transponder unit is mounted in proximity to the sieve or integrated into the sieve.

In a further aspect, an emptying system comprising the suction lance is provided. The emptying system comprises an emptying detection device according to the first aspect of the present disclosure.

BRIEF DESCRIPTION OF THE DRAWINGS

Further advantages and exemplary embodiments will be described with reference to the accompanying drawings.

DETAILED DESCRIPTION

Figure 1:
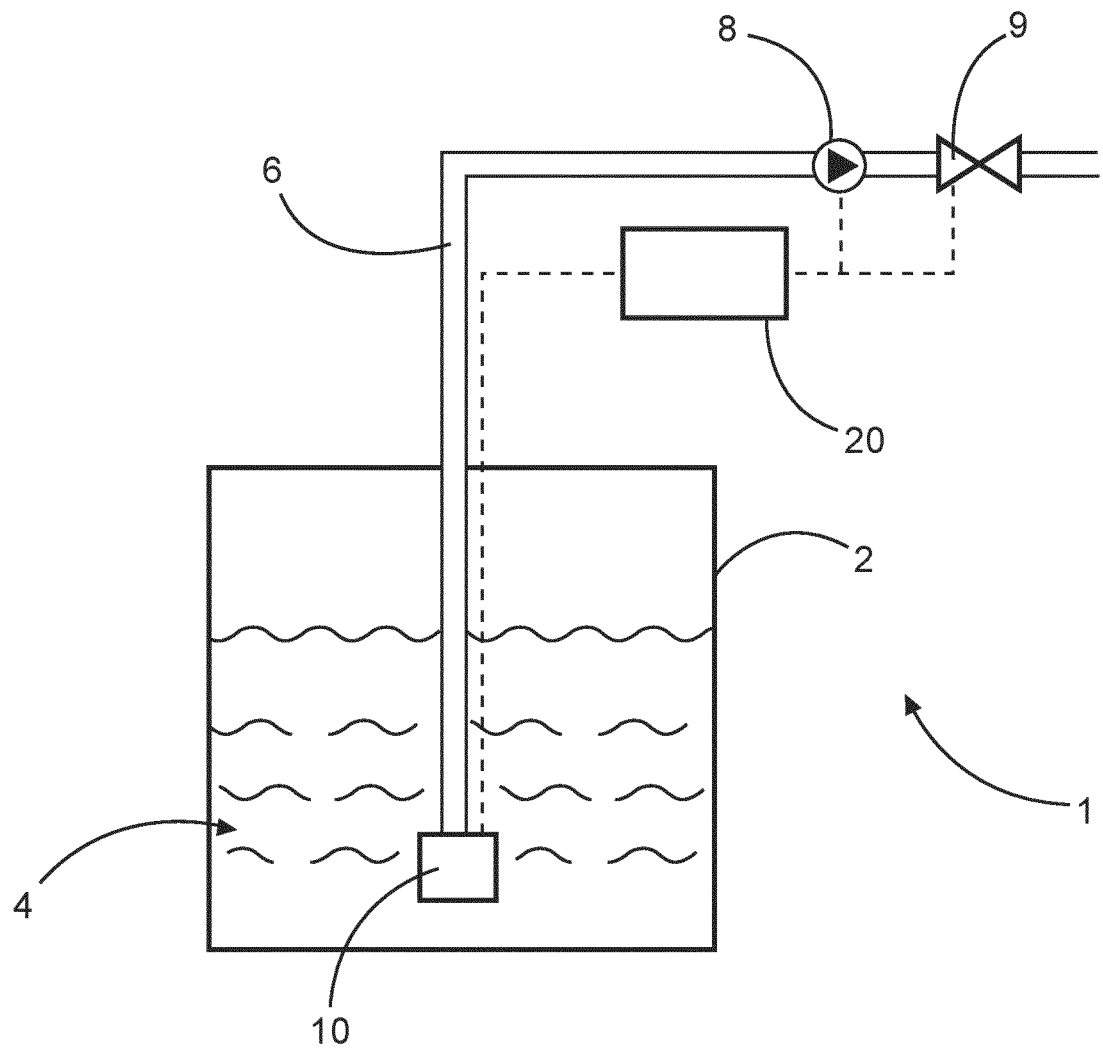
FIG. 1 schematically and exemplarily illustrates an emptying system.

FIG. 1 schematically and exemplarily illustrates an emptying system 1, such as a dosing system, which is configured to obtain liquid 4 from a container 2 using a suction lance 6, a pump 8 and a dosing component 9.

The emptying system 1 draws a measured amount of liquid 4 out of the container 2 and injects it into a tank or a pipe for further use. The pump 8 is powered by an electric motor, an air activator or other suitable means and its operation is controlled by a controller 20, which turns pump 8 on and off and manages the flow rate using the dosing component 9.

Such dosing systems can, for instance, be used in commercial laundry surroundings, such that the liquid 4 includes all kinds of liquids used in laundry. This applies to industrial laundries, health care laundries and/or hospitality laundries. Of course, other applications and other industries can be addressed with the emptying system 1 according to the present disclosure.

At an end of the suction lance 6, an emptying detection device is provided. While in this example, the emptying detection device 10 is located at a lower end of the suction lance 6, the position of the emptying detection device 10 is not limited to the illustrated position relative to the suction lance 6. Instead, the entire emptying detection device 10 or parts thereof may as well be mounted relative to the container 2, for instance.

The emptying detection device 10 is configured to provide an emptying signal to the controller 20. The emptying signal indicates that a level of the liquid 4 within the container 2 falls below a threshold level. The threshold level may be indicative for an emptying of the container 2, i.e., to a liquid level, for which a further operation of the emptying system 1 should be paused, for instance.

In this context, the emptying signal may thus directly stop the pump 8 and/or the dosing component 9 from operating, or, in other examples, correspond to an advanced signal, which indicates that the emptying of the container is to be expected within short. In the latter case, it might be feasible to continue operating the emptying system 1 for a specific amount of time after the emptying signal is provided by the emptying detection device 10.

Figures 2, 3:
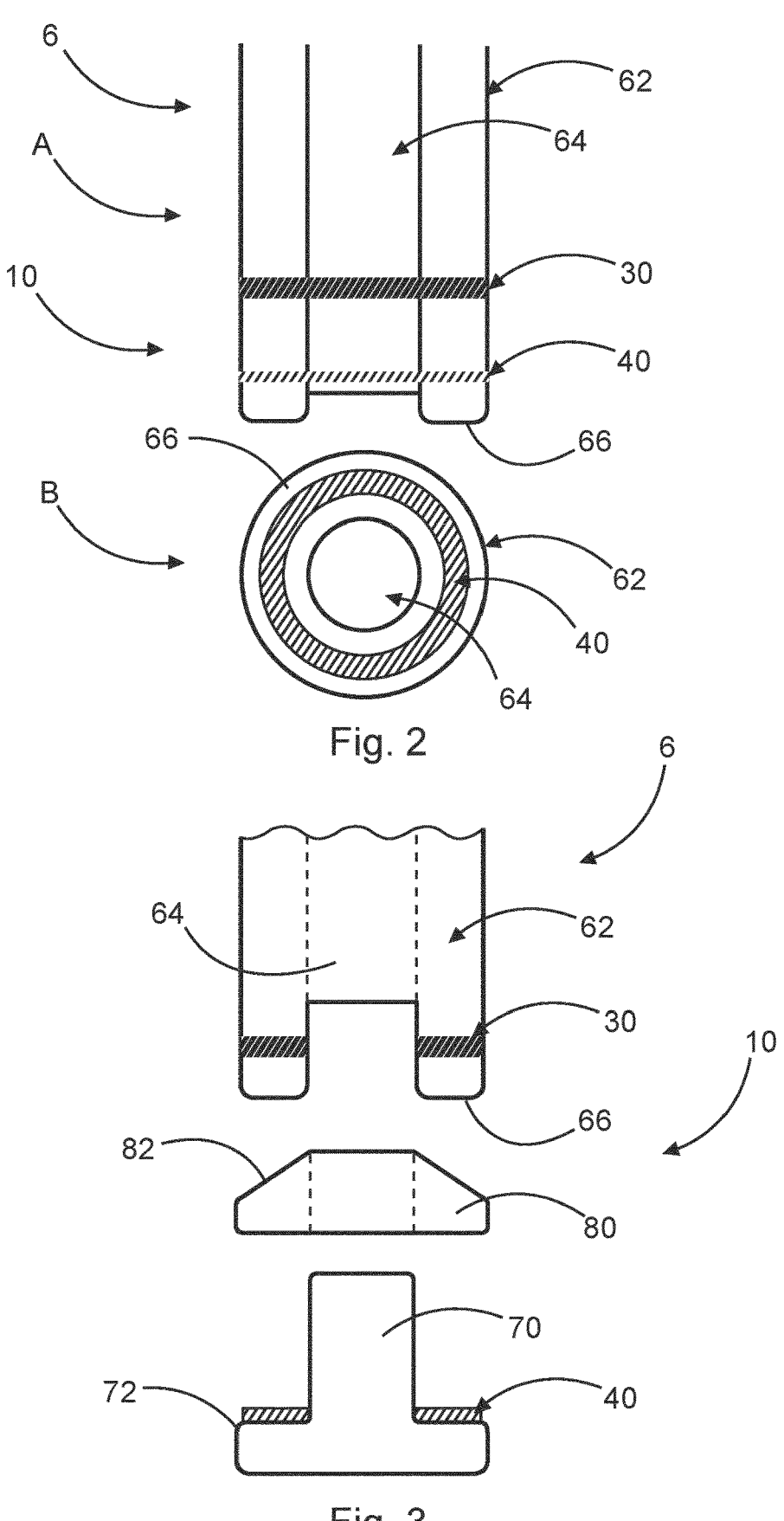
FIG. 2 schematically and exemplarily illustrates an end of a suction lance.
FIG. 3 schematically and exemplarily illustrates an emptying detection system.

FIG. 2 schematically and exemplarily illustrates the emptying detection device 10 mounted to the suction lance 6 in further detail. The suction lance 6 in this example comprises a hollow cylindrical suction tube 62, which surrounds a channel 64, through which the liquid is extracted from the container 2. The liquid 4 enters the suction lance 6 at a lower end 66 thereof. In FIG. 2, a side view A and a view from the bottom B to the suction lance 6 is shown.

The emptying detection device 10 comprises a sending and receiving unit 30 and a transponder unit 40, which are in this example both attached near the end 66 of the suction lance 6. In one example, the sending and receiving unit comprises an antenna, which circularly surrounds the suction lance 6. Likewise, the transponder unit is attached around the suction lance 6.

The sending and receiving unit 30 is configured to emit electromagnetic waves, e.g., RFID signals, and to receive electromagnetic waves. The transponder unit 40 preferentially comprises one or more RFID transponders and is configured to receive electromagnetic waves, e.g., from the sending and receiving unit 30. Upon receipt of a signal from the sending and receiving unit 30, the transponder unit 40 emits a signal in response to the received electromagnetic waves.

The sending and receiving unit 30 is disposed at a larger distance from the end 66 of the suction lance 6 compared to the transponder unit 40. In other examples, the arrangement of the sending and receiving unit 30 and the transponder unit 40 could be switched, i.e., the transponder unit 40 could be provided at a greater distance from the end 66 than the sending and receiving unit 30.

Since there is a distance between the sending and receiving unit 30 and the transponder unit 40, electromagnetic waves only receive the respective other unit in case no liquid is present between both units. The liquid 4 absorbs electromagnetic waves in the relevant frequency ranges, such that only in case no liquid is present between the sending and receiving unit 30, and the transponder unit 40, electromagnetic waves from one of the units is able to reach the respective other unit.

When the container 2 is completely filled with liquid 4, both the sending and receiving unit 30 and the transponder unit 40 are covered with liquid 4. As the emptying of the container 2 progresses, the liquid level falls below the sending and receiving unit 30 such that electromagnetic waves emitted from the sending and receiving unit 30 can propagate through air. Only, when the level of the liquid 4 falls below the transponder unit 40, electromagnetic waves emitted from the sending and receiving unit 30 will reach the transponder unit 40 and vice versa.

Previously known emptying systems relied on one of two different emptying detections. The first one is a floater system, in which a floater is mounted at the bottom end 66 of the suction lance 6. It comprises a magnetic read sensor, wherein the floater will move down as the fill level falls and the read sensor will then send a signal to stop the pump 8 from pumping. The filling measurement relying on the floater is inaccurate and too much liquid 4 is left in the container 2 when the emptying signal is provided. The second known emptying detection is based on conductivity measurement, wherein the conductivity subsides if the fill level falls, which will then cause the pump 8 to stop. While this alternative is more accurate than the floater system, the measurement is influenced by the product and may thus be inaccurate for some products.

The emptying detection device 10, according to the present disclosure, reduces the emptying of residues and makes it as efficient and economical as possible. While it is never possible to empty the containers 2 to 100%, it is an aim of the present disclosure to reduce the amount of residues compared to the previously known solutions. It is impossible to completely empty the container 2, because is crucial that no air be pumped into the dosing system 1.

Compared to the conductivity measurement, the remaining liquid can be reduced by approximately 50% with the present solution. The emptying detection device 10, according to the present disclosure, is reliable irrespective of viscosity and conductivity of the liquid 4.

The transponder unit 40 preferentially comprises a UHF-RFID-transponder; for UHF-transponders, it is known that they will not work in liquids. If the transponder is covered with liquid, it cannot be read, but if the filling level drops down and the transponder gets free of liquid, it can be read. The emptying detection device 10 proved reliable and effective with all kinds of containers 2 and liquids 4.

The sending and receiving unit 30 and the transponder unit 40 are tuned to the needed frequency and the used material, in this example also of the suction lance 6. An antenna of the sending and receiving unit 30 may be tuned for the used wavelength, frequency and resistance. To tune the antennas to the parameters, a special measurement is needed; otherwise, the antenna could fail in an infrequent way. All suitable methods for tuning the antennas, as known to the person skilled in the art, can be used.

An existing suction lance 6 can be retrofitted using the emptying detection device 10 according to the present disclosure in a plurality of ways. For example, it can be feasible to include the transponder unit 40 at the location where the floater of a known reed contact detection was placed. For instance, the transponder unit can be placed at a lower end of such floater.

Alternatively, the transponder unit can be implemented into a sieve of the suction lance 6. The benefit of this solution is that the transponder unit 40 is directly at the bottom of the suction lance 6 and a maximum of emptying of residues is possible.

FIG. 3 schematically and exemplarily illustrates a side view of the suction lance 6 to which an emptying detection device 10, according to the present disclosure, is attached. In this example, the sending and receiving unit 30 is directly attached to the suction tube 62, wherein the transponder unit 40 is provided on an upper surface 72 of a sieve component 70.

The sieve component 70 may be inserted from the side of the end 66 into the channel 64. The sieve component 70 may, for instance, filter the liquid 4 soaked into the suction tube 62, such that no undesired pollution reaches the pump 8, for instance. Between the sieve component 70 and the suction tube 62, in this example, a draining component 80 is provided. The draining component 80 secures the transponder unit 40 between the sieve component 70 and the drain component 80, such that the transponder unit 40 is not in contact with liquid.

The draining component 80 is made of a material, which is transparent to electromagnetic waves in the frequency range emitted by the sending and receiving unit 30 and/or the transponder unit 40, such that electromagnetic waves can reach the respective other component, in case the liquid level falls below the transponder unit 40. The draining component 80 comprises an inclined surface 82 on its upper side, i.e., on the side facing the suction tube 62. The inclined surface has the effect that liquid drains off or peels off more rapidly from the surface due to the aid of gravity. Thus, it can be avoided that residual liquid on the draining component 80 interferes with the transmission of electromagnetic waves between sending and receiving unit 30 and transponder unit 40 although the level of the liquid 4 has already fallen to a lower level.

While a straight inclined shape of inclined surface 82 is illustrated in this example, the shape is of course not limited to this form and also other shapes are feasible, which improve the draining of the draining component 80.

Figure 4:
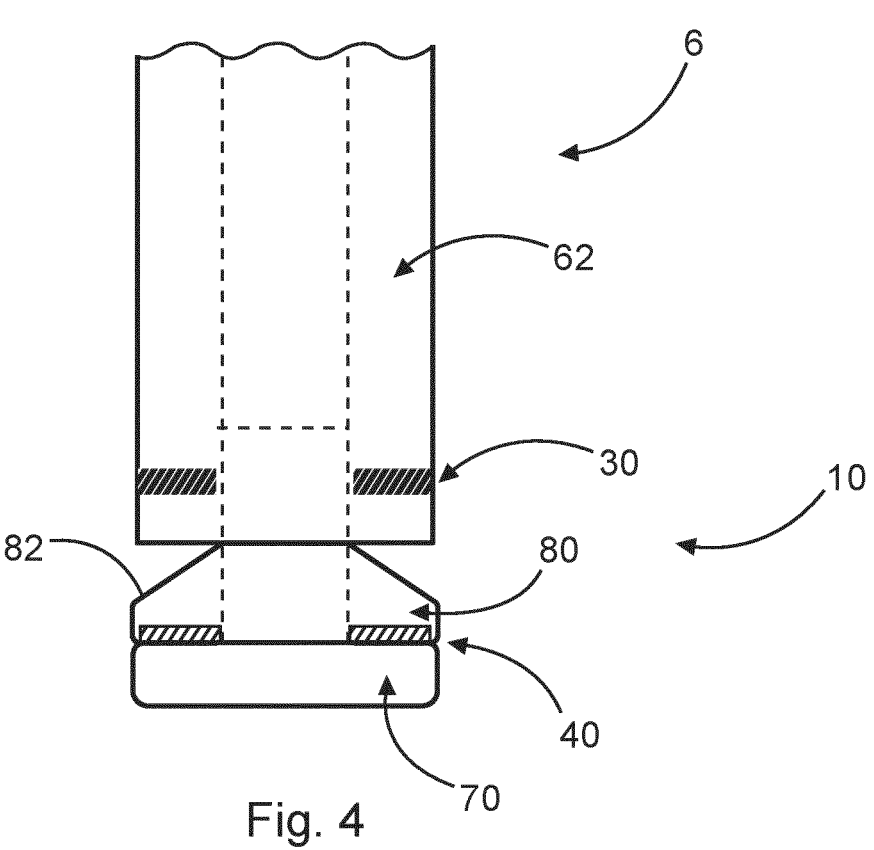
FIG. 4 schematically and exemplarily illustrates an emptying detection system.

FIG. 4 shows the emptying detection device 10 and suction lance 6 of FIG. 3 in an assembled view. It can be seen that the transponder unit 40 is not in direct contact with the liquid 4.

Figure 5:
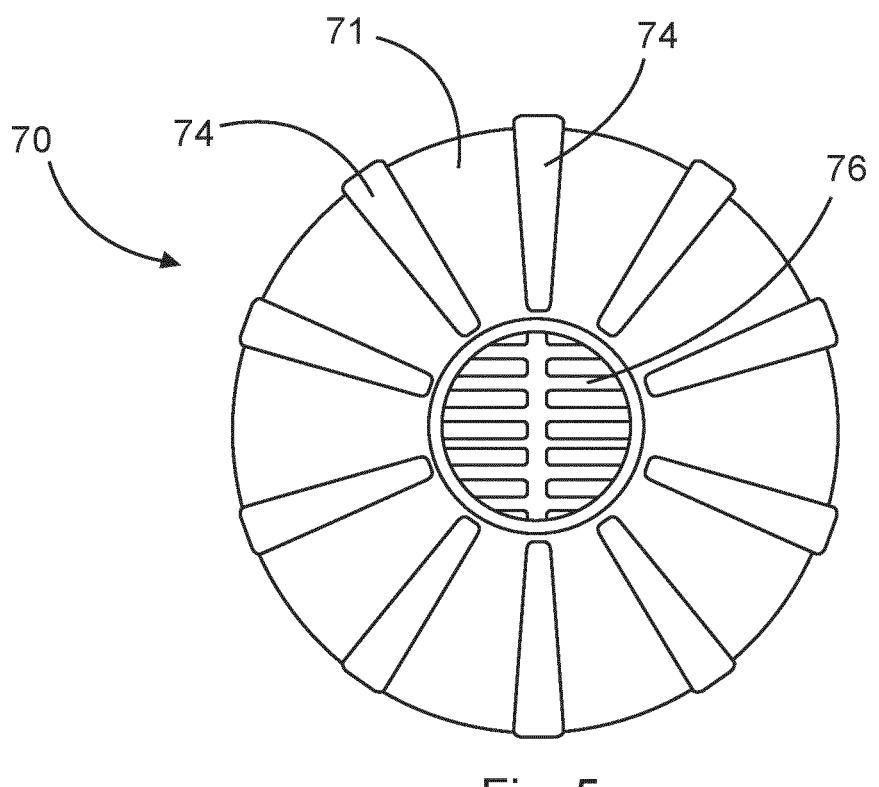
FIG. 5 schematically and exemplarily illustrates a sieve component.

FIG. 5 schematically and exemplarily illustrates a view onto the sieve component 70 from below. The sieve component 70 in this example comprises a coarse sieve 74 formed by several protrusions protruding down from a lower surface 71, which provides two functions. One function is to keep large or coarse pollution away from the suction lance 6, the second function is to keep the channel 64 open, i.e., to keep a distance between the lower surface 71 and a bottom of the container 2 to impede that the sieve component 70 gets sucked in. The sieve component 70 further comprises a fine sieve 76, which covers the entry into the channel 64.

Figure 6:
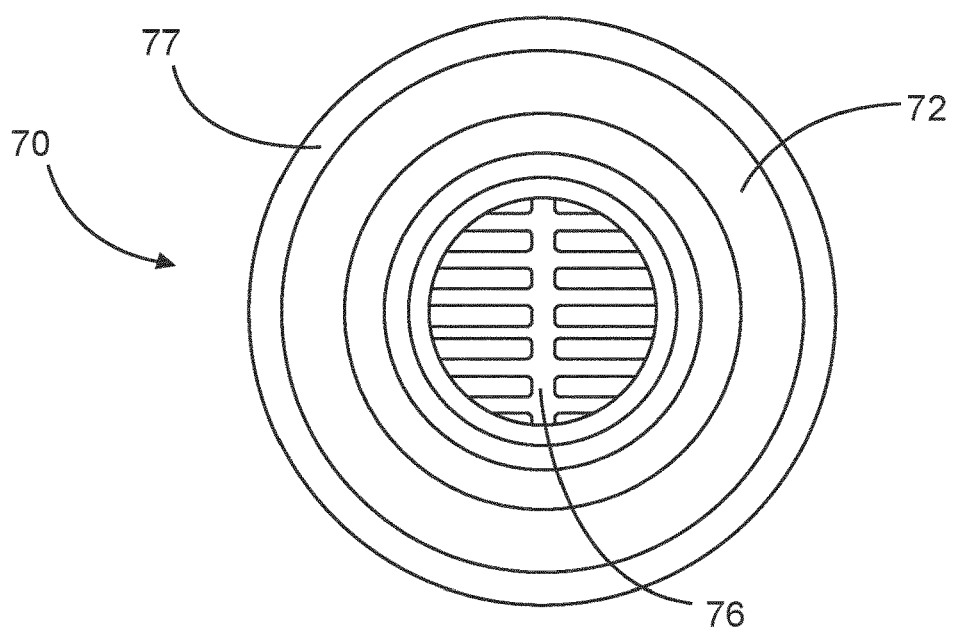
FIG. 6 schematically and exemplarily illustrates the sieve component in a different view.

FIG. 6 schematically and exemplarily illustrates a top view on the sieve component 70, in which the upper surface 72, the fine sieve 76 and a mounting edge 77 for attaching the draining component 80 can be seen. The upper surface 2 is configured to hold the transponder unit 40 and is, in this example, elevated with respect to the edge 77. It should be noted that other design options and ways to attach the sieve component 70 and the draining component 80 are contemplated.

Preferentially, the sieve component 70 comprises a polymer material, such as a recyclable plastic polymer.

Figure 7:
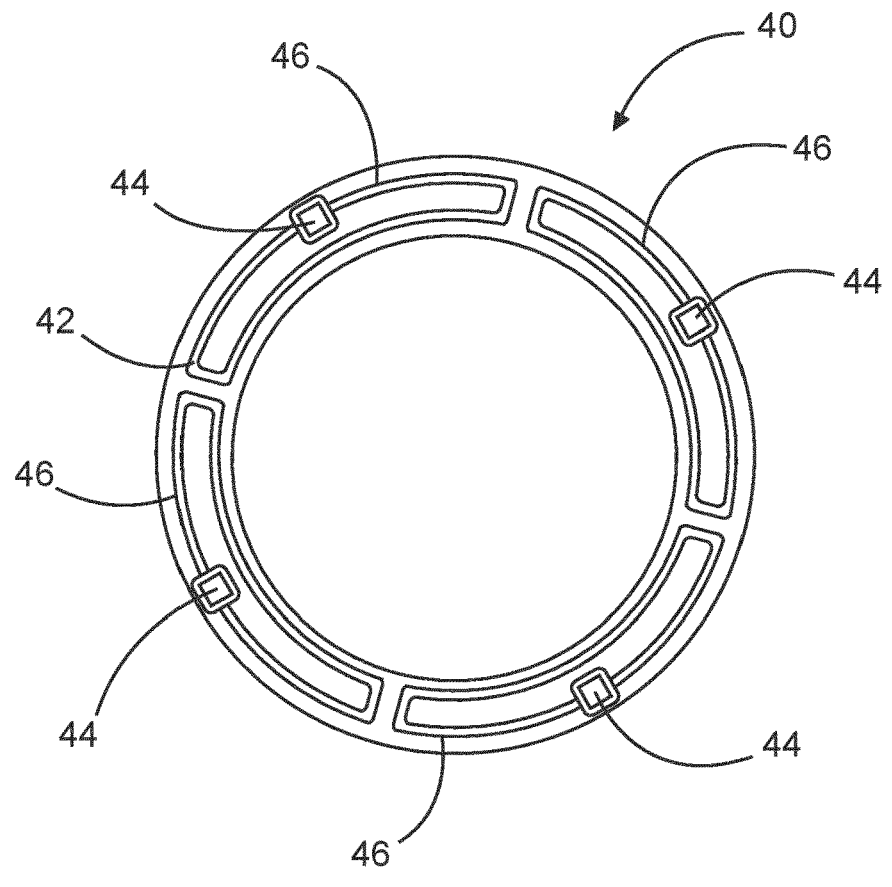
FIG. 7 schematically and exemplarily illustrates a transponder unit.

FIG. 7 schematically and exemplarily illustrates a transponder unit 40. The transponder unit 40 comprises, in this example, four transponder chips 44, which are distributed over an annular plate component 42. The plate component is in one embodiment a circuit board such that individual antennas 46 respectively associated with each of the transponder chips 44 can be formed on the plate component 42.

Preferentially, each antenna 46 covers an area of approximately 90° degrees of the circumference of the annular plate component 42. In this example, each of the antennas 46 is a substantially rectangular antenna comprising one single winding, which is adapted to the circular shape of the plate component 42. The antennas 46 of the respective transponder chips 44 do not overlap, but are arranged side-by-side in a circumferential direction instead.

Figure 8:
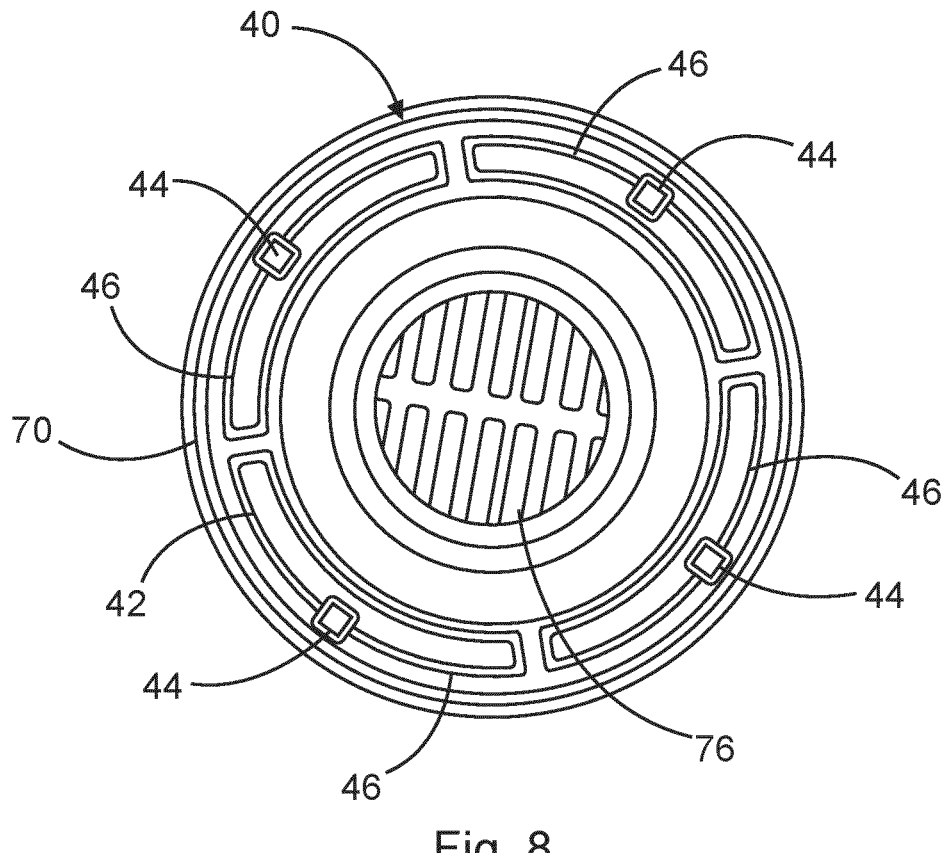
FIG. 8 schematically and exemplarily illustrates the sieve component and mounted transponder unit.

FIG. 8 schematically and exemplarily illustrates the transponder unit 40 mounted on the upper surface 71 of the sieve component 70.

Figure 9:
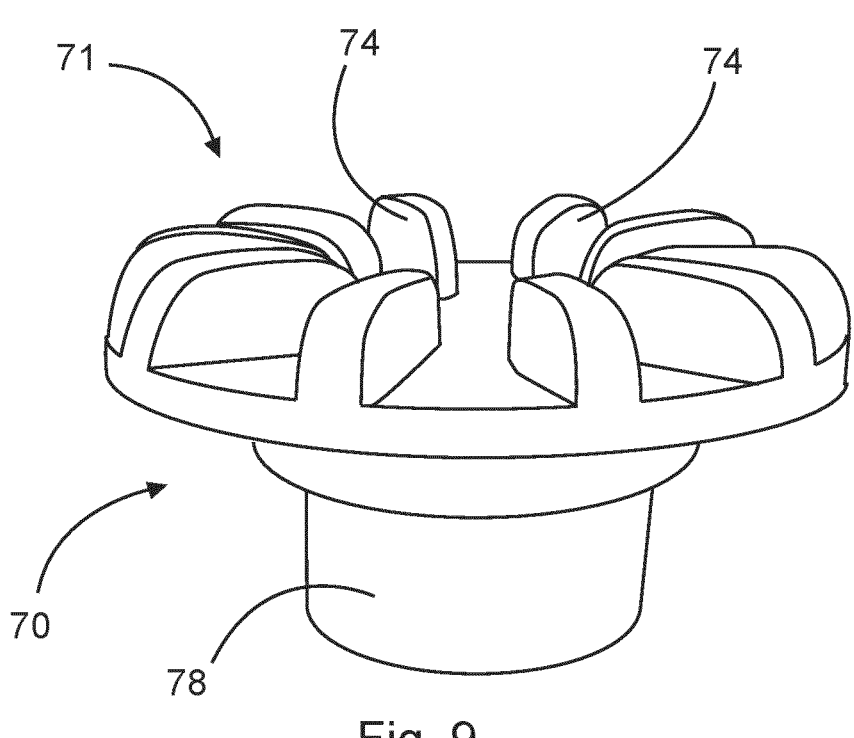
FIG. 9 schematically and exemplarily illustrates the sieve component and mounted transponder unit in a different view.

FIG. 9 schematically and exemplarily illustrates the sieve component 70 in a perspective view. In this view, a shaft part 78 of the sieve component 70 can be seen, which is inserted within the suction tube 62 of the suction lance 6.

Figure 10:
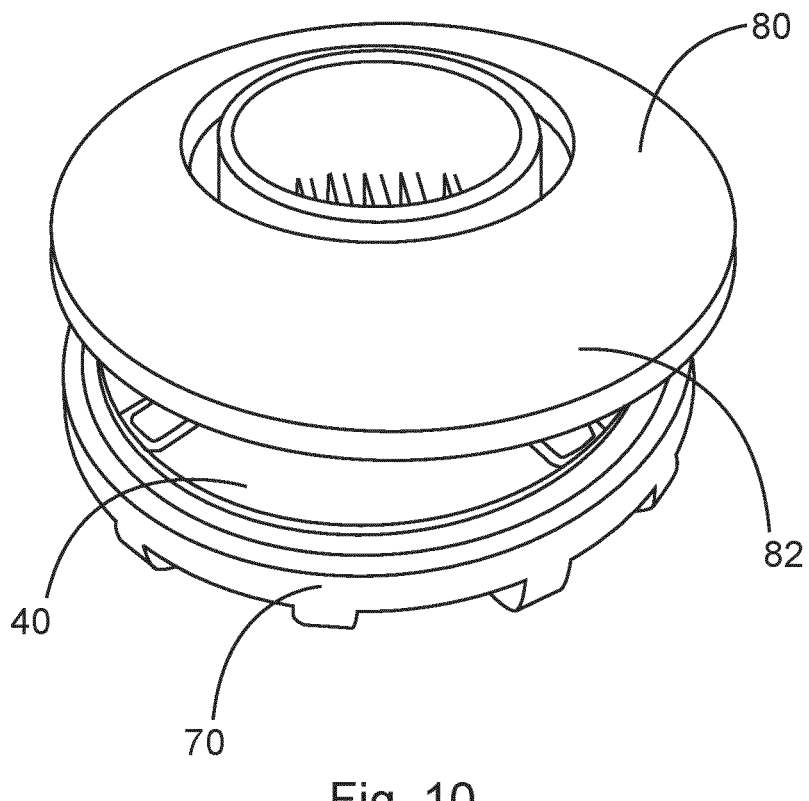
FIG. 10 schematically and exemplarily illustrates assembled sieve component.

FIG. 10 schematically and exemplarily illustrates the mounting process of the draining component 80 on top of the assembly of the sieve component 70 and the transponder unit 40.

Even if in the drawings different aspects or features of the invention are shown in combination, the skilled person will appreciate—unless indicated otherwise—that the combinations shown and discussed are not exhaustive and variations thereof are possible. For example, corresponding elements or feature complexes may be mutually exchanges between different embodiments. This may refer to the transponder unit 40 and the sending and receiving unit 30.

Upon implementing the invention, single components, e.g., a processor, may fulfill a function or functions of several elements mentioned in the claims. Processes or operations like sending, controlling, and receiving may be performed by a computer program code of a computer program or as dedicated hardware.

The present disclosure allows an economical emptying of residues. In an example, the example solution according to the present disclosure may be implemented into a previously available suction lance. In this suction lance, the sending and receiving unit 30 and the transponder unit 40 have to be integrated. In case the suction lance comprised a reed-sensor, such reed-sensor is preferentially removed in a first step to make space for antenna and transponder, for instance.

In one embodiment, the lower part of the suction lance can comprise a sieve, a sieve cover, and a valve barrel. In one example, the sieve is the lowest part of the suction lance. For the positioning of the transponder, the sieve is a preferred position, because it is the lowest position of the suction lance. Further preferentially, a plane on the bottom of the sieve is provided where the transponder can be mounted. The transponder may be part of the transponder unit 40.

The sieve cover covers the transponder, such that it is not in direct contact with the product. It preferentially comprises a skewed surface that the product can drain off without big residues on the top of the transponder.

The antenna, which may be part of the sending and receiving unit 30, may be mounted in the valve barrel in one embodiment. Preferentially, a slit such as a circled slit is constructed, where the antenna can be embedded. To cover the antenna, also with an aim to avoid contact with the product, a pipe may in one embodiment be glued around the valve barrel to the top of the suction lance.

The antenna development is in one embodiment an iterative process. It is preferentially be calculated for usage in Europe based on the ETSI (European Telecommunications Standards Institute) and all the parameters like, the material of the suction lance, the emptying product, etc.

In a first design of the antenna, a simple loop antenna is provided. It preferentially comprises a printed circuit board, PCB, wherein the antenna trace is preferentially made of copper.

An improved antenna is developed as a dipole antenna. This antenna is capable to build up an electrical field, not a magnetic field. If the antenna built a magnetic field, the communication between the antenna and transponder will work on the inductive coupling principle. The inventors of the present application have shown that with an electrical field it can be ensured that the transponder will not work in water and liquid.

In a preferred embodiment, the antenna is tuned on the right frequency range. The frequency range for Europe is preferentially between 865 MHz and 868 MHz (ETSI). The frequency range in America is preferentially between 902 MHz and 928 MHz (FCC).

To get the antenna on the right frequency range, a lot of parameters must be heeded, because small differences can have an influence on the frequency.

The antenna material is preferentially a PCB material, wherein of course other materials are feasible. The antenna dimensions are limited to the dimensions of the valve barrel or the mounting position within the suction lance, respectively. The thickness is flexible. The trace material is preferentially copper. The suction lance is in one embodiment made of PVC. The PVC material is in this embodiment also the casing around the antenna.

The antenna works in a special environment. The hole in the antenna will be flown through of liquid. This has a big influence on the antenna. There are many different liquids which may flow through the hole in the antenna, but it has shown that water parameters can be assumed for determining the antenna properties.

Figure 11:
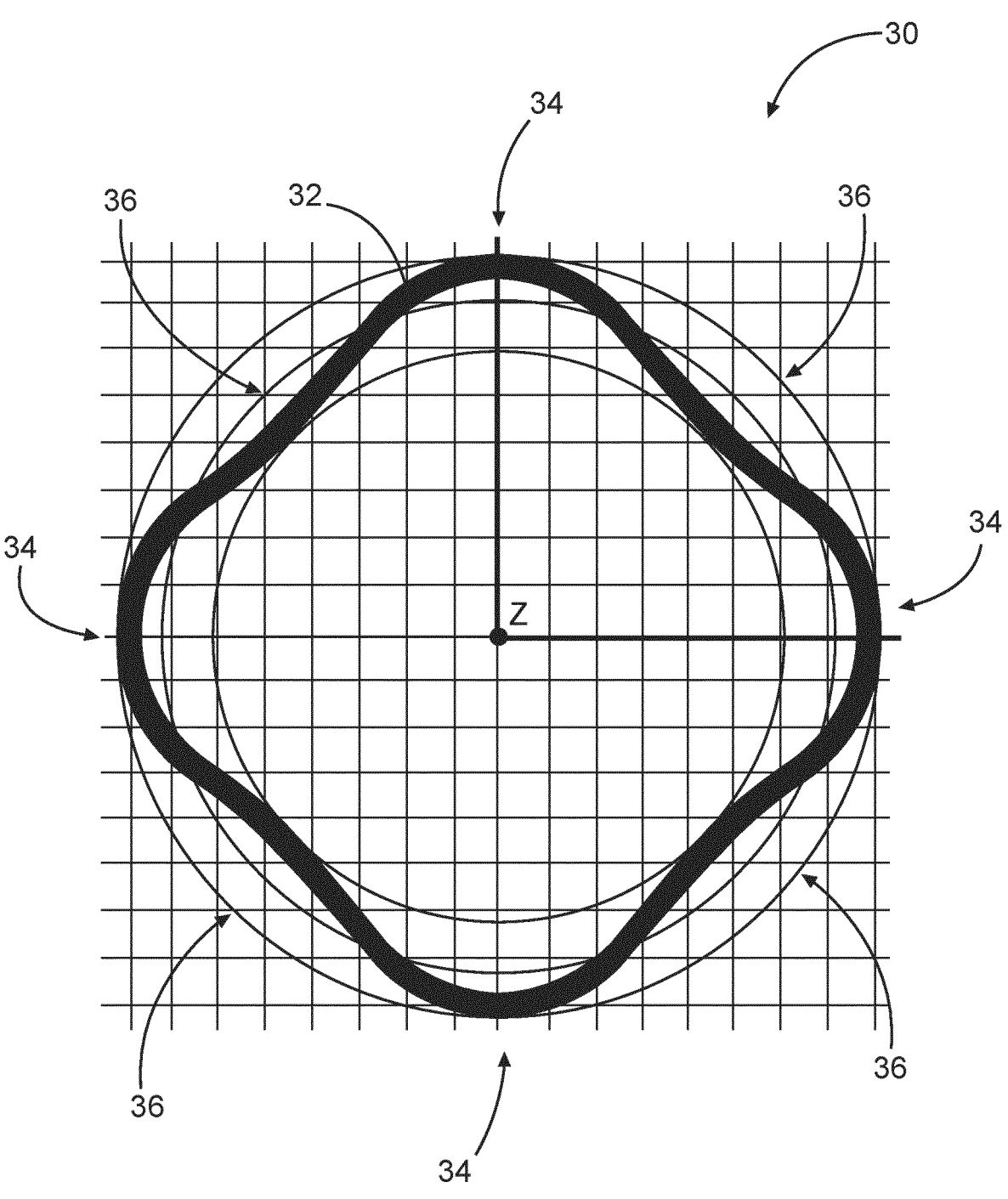
FIG. 11 schematically and exemplarily illustrates an antenna of a sending and receiving unit.

FIG. 11 schematically and exemplarily illustrates an example of an antenna 32 of a sending and receiving unit 30. It can be seen that the antenna 32 is not circular but comprises a number of outwardly and inwardly curved sections, in this example four outwardly curved sections 34 and four inwardly curved sections 36, while of course a different number of inwardly and outwardly curved sections such as three or more of four are contemplated.

Figures 12, 13:
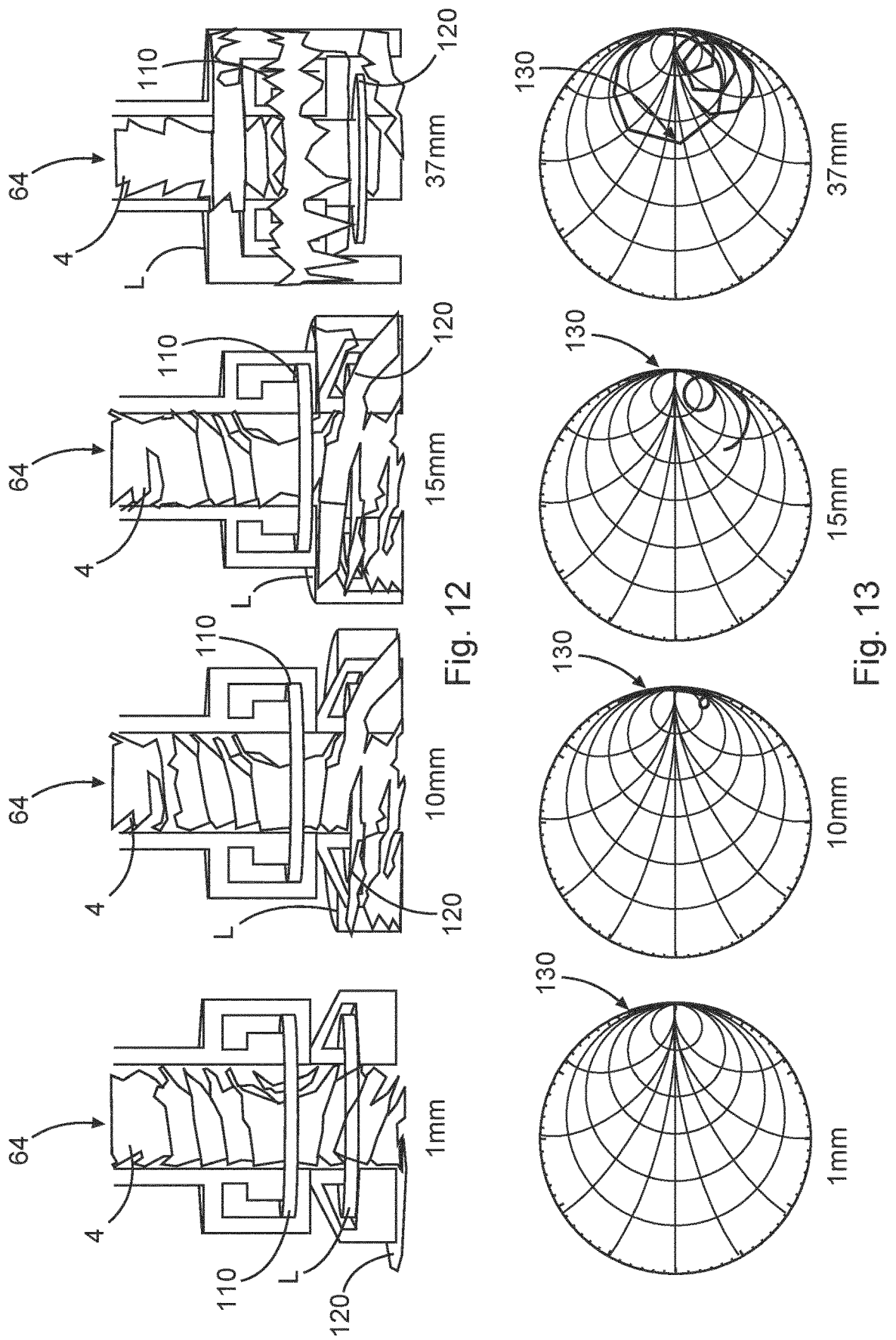
FIG. 12 schematically and exemplarily illustrates the diffusion of the electrical field for different filling levels.
FIG. 13 schematically and exemplarily illustrates a Smith diagram for the filling levels of the electrical field.

FIG. 12 schematically and exemplarily illustrates the diffusion of the electrical field for different filling levels L, in this example from left to right of 1 mm, 10 mm, 15 mm, and 37 mm. An example of a reader antenna 110 as part of the sending and receiving unit 30 and a transponder antenna 120 as part of the transponder unit 40 are illustrated at the lower end of a suction lance 6. It can be seen that liquid 4 is present inside channel 64 for all exemplary filling levels L.

Below filling level L of 10 mm, both reader antenna 110 and transponder antenna 120 are in this example not covered by liquid 4. The diffusing electrical field is illustrated within the channel 64 and the space between reader antenna 110 and transponder antenna 120, wherein a lighter shade corresponds to a lighter electrical field and a darker color corresponds to a stronger electrical field.

It can be seen that the generated electrical field is spread out within the water column in the channel 64 in the suction lance 6. In other words, it can be seen that a signal from the transponder unit 40 can be detected until a filling level when total reflection of the antenna occurs, in this example at approx. 37 mm. Then the signal stops.

FIG. 13 schematically and exemplarily illustrates a Smith diagram for the filling levels of FIG. 12. An exemplary frequency of, for instance, 866 MHz, is pointed to with an arrow 130 in all four diagrams. It can be seen that for the exemplary frequency total reflections occur until a filling level of 37 mm.

Accordingly, the adaption of the antennas is preferentially depending on the filling level.

Figure 14:
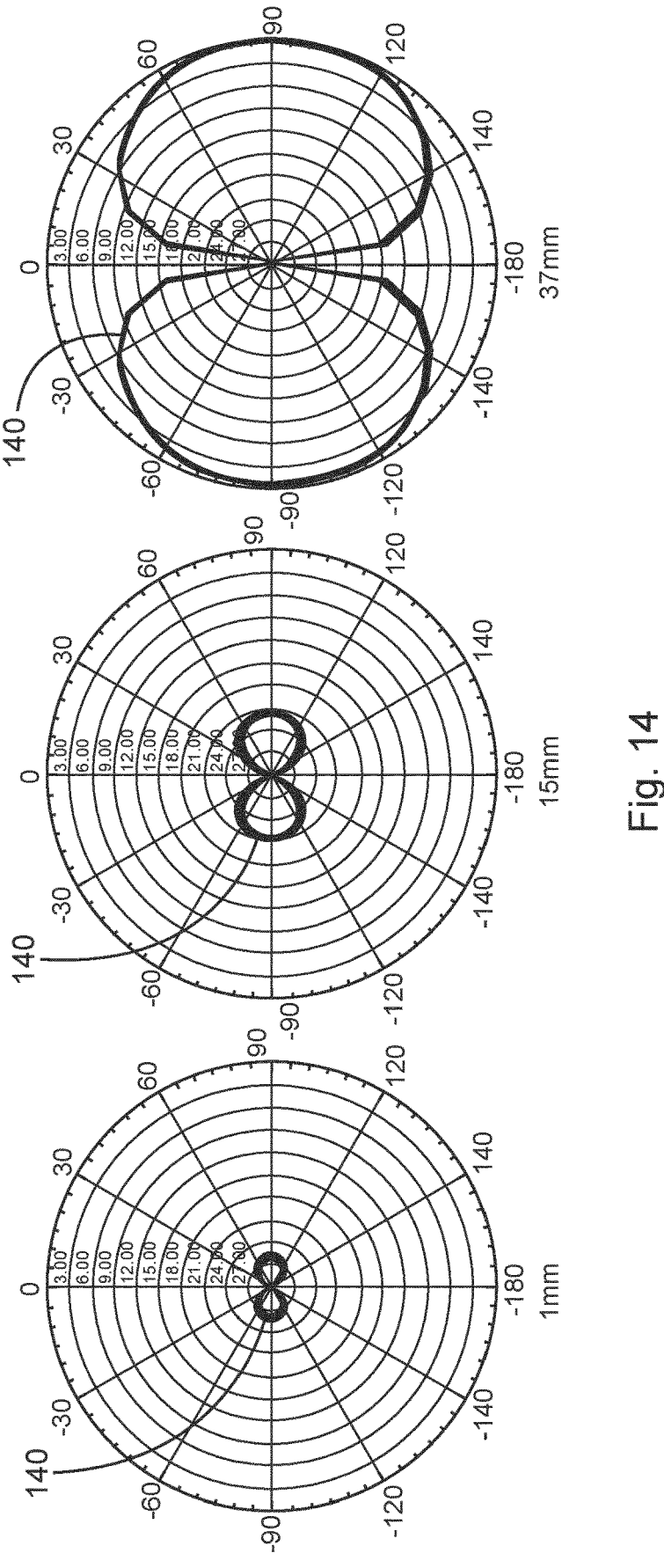
FIG. 14 schematically and exemplarily illustrates a realized gain for three filling levels of the electrical field.

FIG. 14 schematically and exemplarily illustrates a realized gain 140 for three filling levels of 1 mm, 15 mm and 37 mm, respectively, of the arrangement illustrated in FIG. 12. In FIG. 14 the antenna gain consolidates the directivity and the efficiency. We can see a very big difference between the lower filling levels and a filling level of 37 mm.

Figure 15:
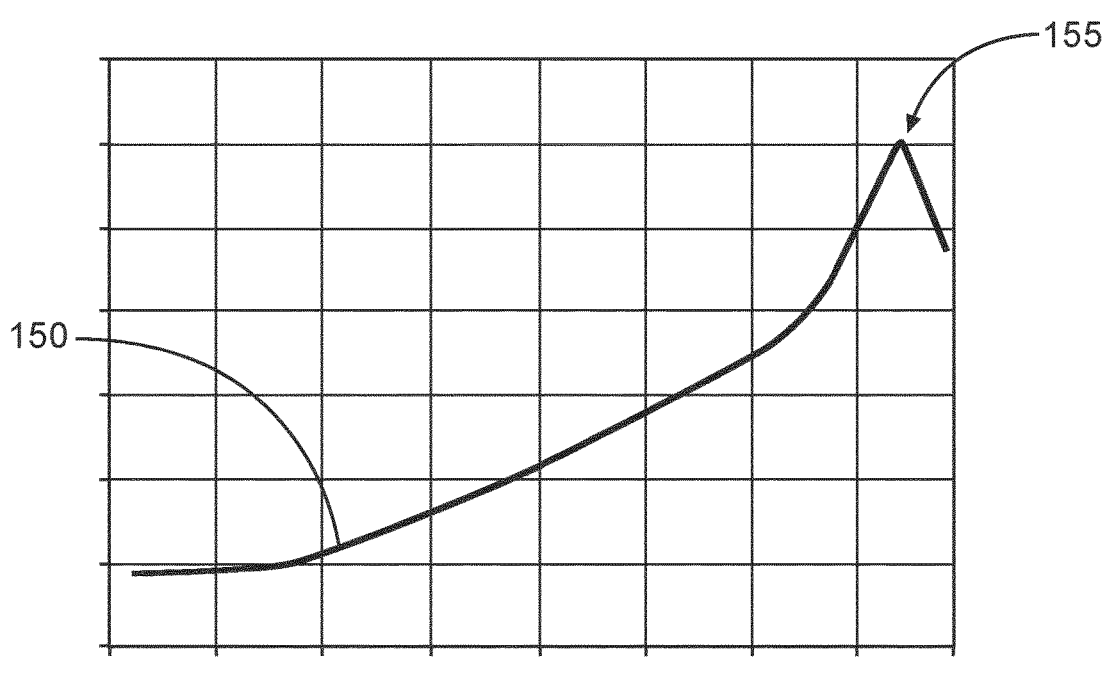
FIG. 15 schematically and exemplarily illustrates a realized gain versus the filling level on horizontal axis of the electrical field.

FIG. 15 schematically and exemplarily illustrates a realized gain 150 versus the filling level on horizontal axis. At a peak 155 a maximum gain can be obtained.

Figure 16:
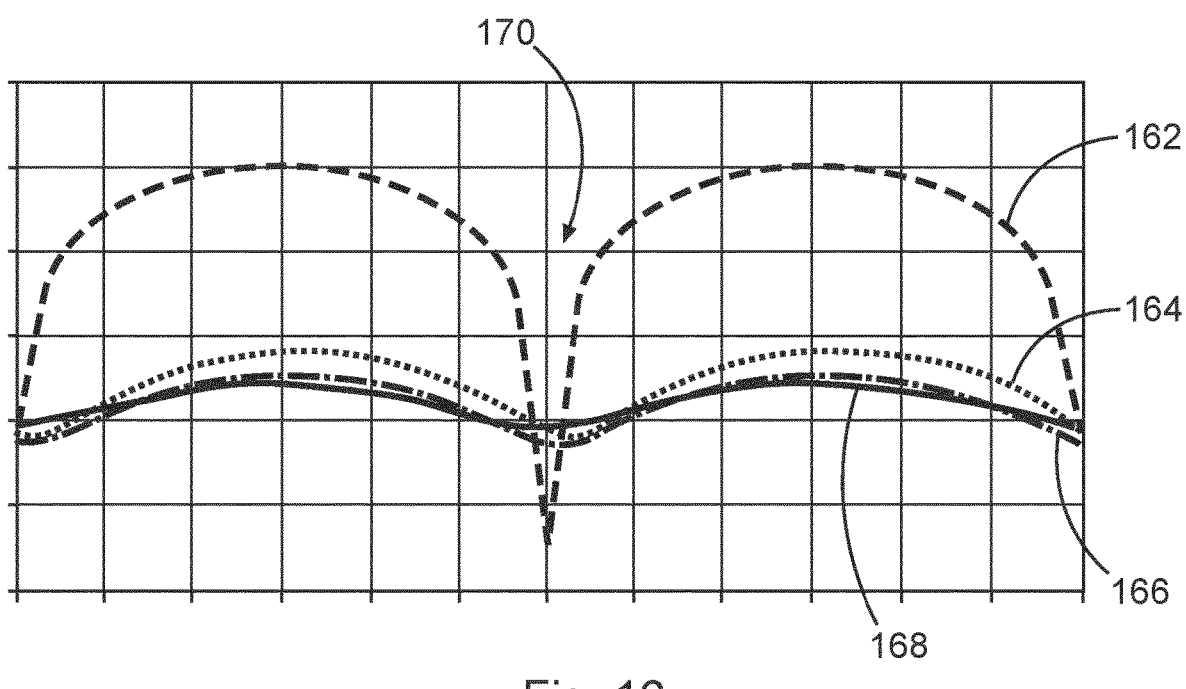
FIG. 16 schematically and exemplarily illustrates the realized gain versus a directional angle theta for the filling level of the electrical field.

FIG. 16 schematically and exemplarily illustrates the realized gain versus a directional angle theta for the filling level of 1 mm (line 168), 10 mm (line 166), 15 mm (line 164), and 37 mm (line 162). A center 170 corresponds to a directional angle of 0°.

There is a difference of more than 20 dB in the realized gain. That means it is possible to use this difference as a switching threshold. The difference is essentially based on the impact of water on the antenna adaption and not on the attenuation of water.

Figure 17:
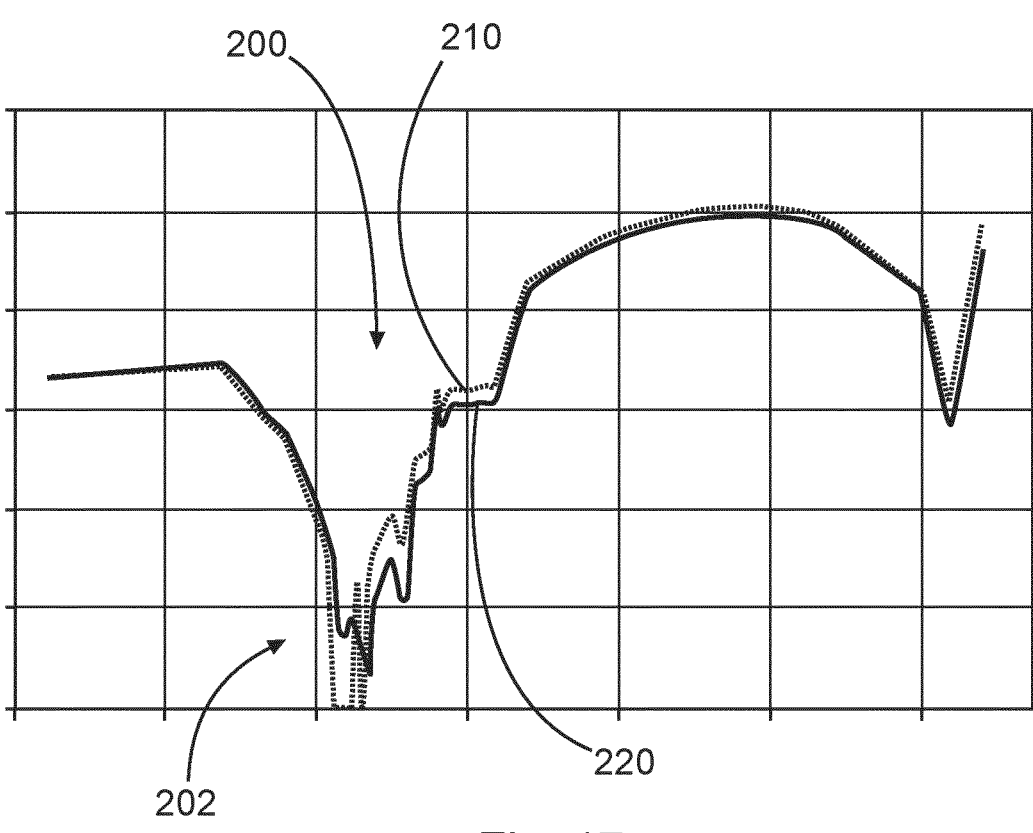
FIG. 17 schematically and exemplarily illustrates a transfer characteristic, where mounting chambers of the sending and receiving unit and the transponder unit are allowed to be filled with liquid.

FIG. 17 schematically and exemplarily illustrates a transfer characteristic 200 for a different example, where mounting chambers of the sending and receiving unit 30 and the transponder unit 40 are allowed to be filled with liquid. The transfer characteristic between the reader antenna and the transponder antenna on 860 MHz (line 210) and 870 MHz (line 220) via a filling level is illustrated in FIG. 17.

We can see that there is a clear switching threshold on a filling level 202, for instance at approx. 10 mm. It is thus preferred that the liquid can move closer to the transponder unit 40, e.g. become in contact with the transponder unit 40, such that a switching threshold at a lower filling level can be detected.

Figure 18:
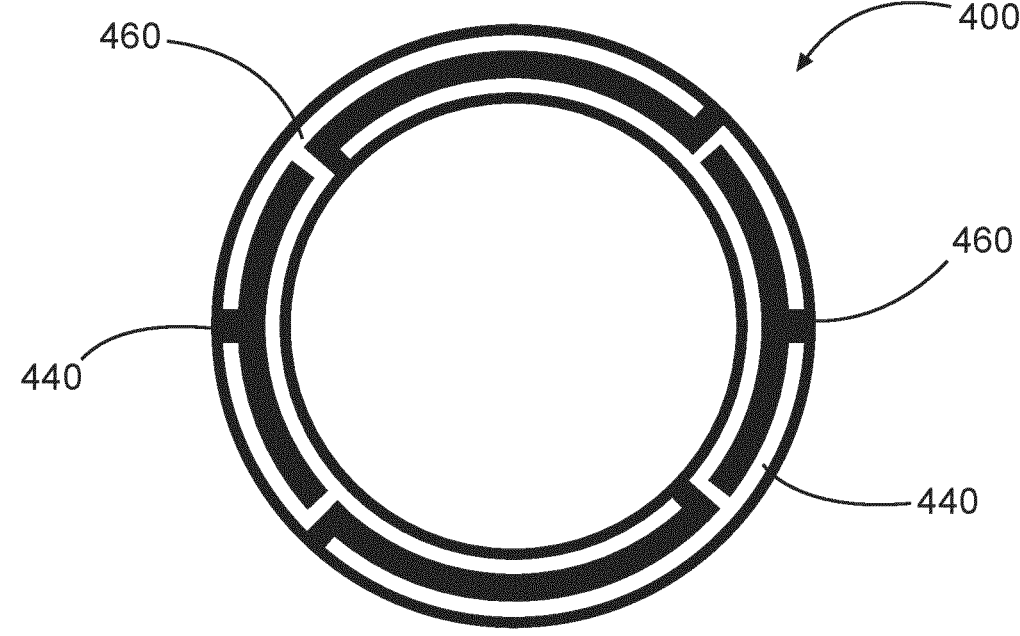
FIG. 18 schematically and exemplarily illustrates an alternative of a transponder unit, which can be used interchangeably with the transponder unit.

FIG. 18 schematically and exemplarily illustrates an alternative of a transponder unit 400, which can be used interchangeably with the transponder unit 40. The transponder unit 400 comprises two transponder elements or chips 440 and two corresponding antennas 460. The white lines in FIG. 18 are the antenna structures. For this transponder, the frequency measurement looks as followed (FIG. 18). The design with two loops is in some embodiments beneficial since the performance is nearly the same in the ETSI frequency range and in the FCC frequency range.

Figure 19:
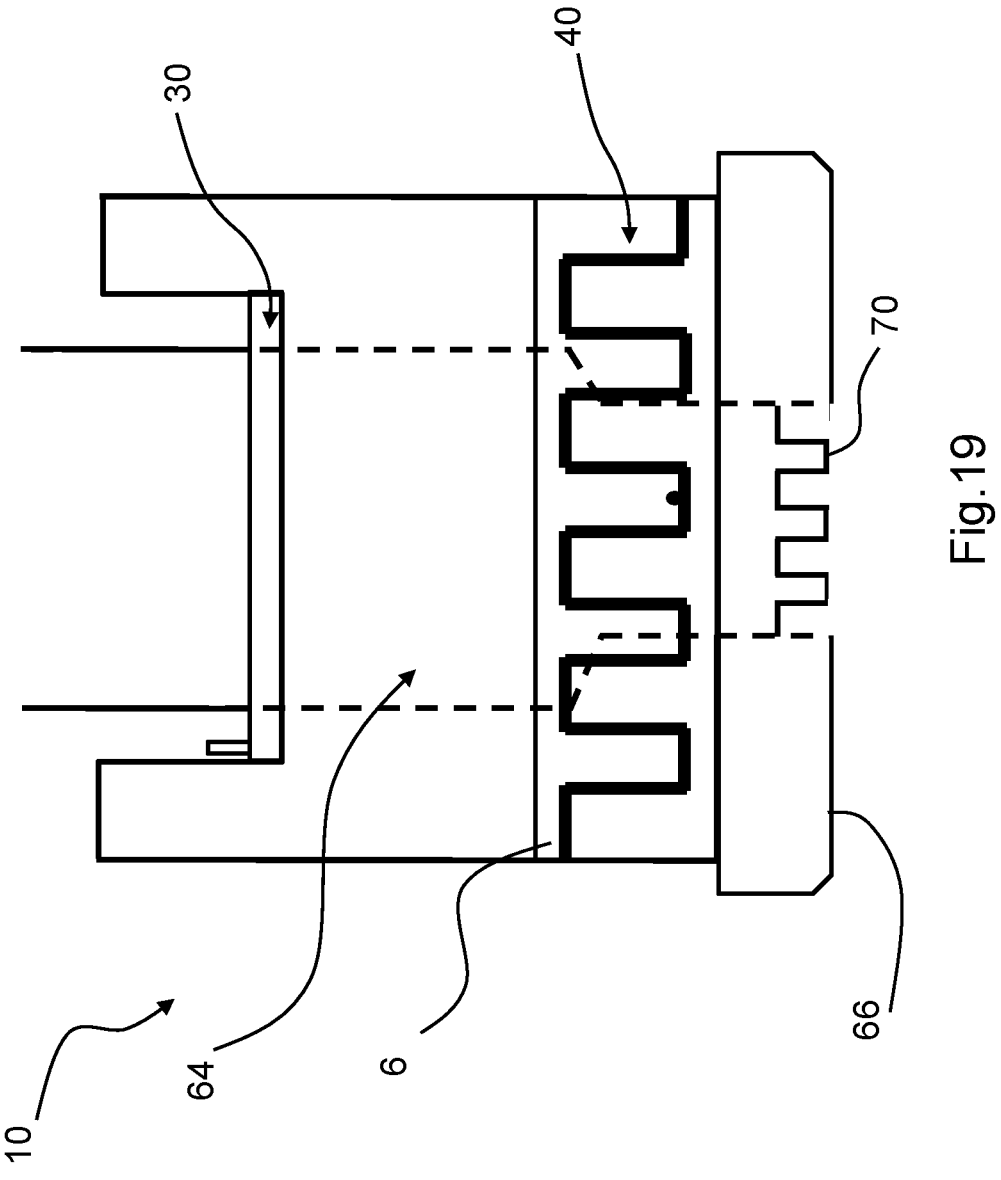
FIG. 19 schematically and exemplarily illustrates another embodiment of an emptying detection system.

FIG. 19 schematically and exemplarily illustrates another embodiment of the emptying detection device 10. Different from the other illustrated embodiments is the geometrical layout of the suction lance 6 and e.g., the arrangement of the transponder unit 40. In this embodiment, the transponder unit 40 comprises a transponder sleeve or banderole, which is wrapped around an outer surface of the suction lance 6 near the lower end 66 thereof. The lower end 66 may have a slightly larger diameter than the position of the transponder unit 40 to impede the transponder from falling off. Further, the sending and receiving unit 30 may comprise an antenna that is received within and protected by a surrounding wall of the suction lance 6. Since the lower end 66 is thin and the location of the transponder unit 40 is in close proximity to the suction opening defined by sieve 70, a thorough emptying with reduced residual liquids can be performed.

In one implementation for determining the receipt of the signal from the transponder unit 40, software is loaded onto the RFID reader or another computing unit that is connected to the RFID reader, i.e. e.g. to the sending and receiving unit 30. This starts a reading process on the reader and measures the reception quality of the transponder unit 40.

The reception quality can include the reception field strength (RSSI value) or the number of times a transponder was detected within a time interval. The measured reception quality is then filtered using a threshold value, so that an RFID transponder that has exceeded an RSSI value or a number of detections per time interval, or a combination of both values with corresponding threshold values, triggers an event from the software.

This event signals that the capacity of, for instance, the suction lance has reached a corresponding value. The event can then be forwarded further for processing to the emptying system 1.

LIST OF REFERENCES 1 emptying system
2 container
4 liquid
6 suction lance
8 pump
9 dosing component
10 emptying detection device
20 controller
30 sending and receiving unit 32 antenna
34 outwardly curved section
36 inwardly curved section
40 transponder unit
42 plate component
44 transponder chip
46 antenna
62 suction tube
64 channel
66 lower end
70 sieve component
71 lower surface
72 upper surface
74 coarse sieve
76 fine sieve
77 mounting edge
80 draining component
82 inclined surface
110 reader antenna
120 transponder antenna
130 arrow
140 realized gain
150 realized gain
155 peak
162, 164, 166, 168 realized gain
170 center
200 transfer characteristic
202 filling level
210, 220 transfer characteristic
400 transponder unit
440 transponder chip
460 antenna
L filling level

The invention claimed is:

1. An emptying detection device configured to provide an emptying signal to an emptying system for emptying a container including a suction lance, the emptying detection device being configured to determine a level of a liquid in the container relative to the emptying detection device, the emptying detection device comprising:

a sending and receiving unit being configured to emit electromagnetic waves and to receive electromagnetic waves, and a transponder unit being configured to receive electromagnetic waves from the sending and receiving unit, and to emit a signal in response to the received electromagnetic waves, and wherein the sending and receiving unit is configured to:

emit electromagnetic waves at a frequency for which the liquid has a non-negligible absorption coefficient, provide an emptying signal to the emptying system in response to receipt of the signal from the transponder unit in case at least one of a) both of the transponder unit and the sending end receiving unit are located below the level of liquid and b) a reception quality of the signal from the transponder unit received by the sending and receiving unit is above a predefined threshold, and adapt the emptying signal as an analogue or digital signal according to an interface of the emptying system.

2. The emptying detection device of claim 1, wherein the emptying signal is a binary signal, the binary signal indicating either empty or not empty.

3. The emptying detection device of claim 1, wherein the transponder unit comprises an RFID transponder, in particular a passive RFID transponder, and the RFID transponder is configured to operate in an ISM-band, as at least one of an HF-RFID, UHF-RFID and GHz-RFID transponder.

4. The emptying detection device of claim 1, wherein the transponder unit is attachable to the emptying system, in particular to a suction lance of the emptying system, and the sending and receiving unit is attachable to the emptying system, in particular to the suction lance, the transponder unit being attachable to a position closer to an end of the emptying system than the sending and receiving unit.

5. The emptying detection device of claim 1, wherein the sending and receiving unit is attachable to the emptying system, in particular to a suction lance of the emptying system, and the transponder unit is attachable to the emptying system, in particular to the suction lance, the sending and receiving unit being attachable to a position closer to an end of the emptying system than the transponder unit.

6. The emptying detection device of claim 1, wherein the sending and receiving unit is configured to send and to receive electromagnetic waves at a frequency at which the liquid is absorbing in an ISM-band of at least one of an HF, UHF, and GHz frequency range.

7. The emptying detection device of claim 1, wherein the transponder unit includes a transponder chip, a size of the transponder chip is not more than 1 cm.

8. The emptying detection device of claim 1, wherein at least one of the sending and receiving unit and the transponder unit has an annular shape.

9. The emptying detection device of claim 1, wherein the transponder unit includes a plurality of transponder chips, wherein the plurality of transponder chips is distributed over the transponder unit.

10. The emptying detection device of claim 1, wherein the sending and receiving unit and/or the transponder unit are coated with a polymer.

11. The emptying detection device of claim 1, wherein only part of the space between the sending and receiving unit and the transponder unit can be filled by the liquid, the part having a geometrical shape that assists the liquid to flow off.

12. An emptying detection device configured to provide an emptying signal to an emptying system for emptying a container including a suction lance, the emptying detection device being configured to determine a level of a liquid in the container relative to the emptying detection device, the emptying detection device comprising:

a sending and receiving unit being configured to emit electromagnetic waves and to receive electromagnetic waves, and a transponder unit being configured to receive electromagnetic waves from the sending and receiving unit, and to emit a signal in response to the received electromagnetic waves, and wherein the sending and receiving unit is configured to:

emit electromagnetic waves at a frequency for which the liquid has a non-negligible absorption coefficient, and provide an emptying signal to the emptying system in response to receipt of the signal from the transponder unit in case at least one of a) both of the transponder unit and the sending end receiving unit are located below the level of liquid and b) a reception quality of the signal from the transponder unit received by the sending and receiving unit is above a predefined threshold, wherein the emptying detection device is attachable or integrated in a suction lance made out of a polymer material, allowing the propagation of electromagnetic waves in an ISM-band of at least one of an HF, UHF and GHz frequency range through the suction lance.

13. A suction lance for an emptying system for emptying a container of a dosing system, comprising:

an emptying detection device configured to provide an emptying signal to an emptying system for emptying a container including a suction lance, the emptying detection device being configured to determine a level of a liquid in the container relative to the emptying detection device, the emptying detection device comprising:

a sending and receiving unit being configured to emit electromagnetic waves and to receive electromagnetic waves, and a transponder unit being configured to receive electromagnetic waves from the sending and receiving unit, and to emit a signal in response to the received electromagnetic waves, and wherein the sending and receiving unit is configured to:

emit electromagnetic waves at a frequency for which the liquid has a non-negligible absorption coefficient, and provide an emptying signal to the emptying system in response to receipt of the signal from the transponder unit in case at least one of a) both of the transponder unit and the sending end receiving unit are located below the level of liquid and b) a reception quality of the signal from the transponder unit received by the sending and receiving unit is above a predefined threshold;

a hollow guiding element, wherein liquid is sucked through the hollow guiding element for emptying the container; wherein at least one of the sending and receiving unit and the transponder unit is mounted in proximity to an end of the hollow guiding element.

14. The suction lance of claim 13, further comprising a sieve removably attached to the hollow guiding element, wherein the transponder unit is mounted in proximity to the sieve or integrated into the sieve.

15. An emptying system for emptying a container of a dosing system, comprising: the suction lance of claim 13.

16. A method of retrofitting a suction lance comprising:

a filling sensor is removed, replaced or left in place, and an emptying detection device including a passive RFID transponder attached on the suction lance, the emptying detection device being configured to provide an emptying signal to an emptying system for emptying a container and configured to determine a level of a liquid in the container relative to the emptying detection device, the emptying detection device including a sending and receiving unit being configured to emit electromagnetic waves and to receive electromagnetic waves, and a transponder unit being configured to receive electromagnetic waves from the sending and receiving unit, and to emit a signal in response to the received electromagnetic waves, and wherein the sending and receiving unit is configured to:

emit electromagnetic waves at a frequency for which the liquid has a non-negligible absorption coefficient, and provide an emptying signal to the emptying system in response to receipt of the signal from the transponder unit in case at least one of a) both of the transponder unit and the sending end receiving unit are located below the level of liquid and b) a reception quality of the signal from the transponder unit received by the sending and receiving unit is above a predefined threshold.

* * * * *